United States Patent
Cooper et al.

(10) Patent No.: US 7,438,987 B2
(45) Date of Patent: Oct. 21, 2008

(54) CARBON FUEL PARTICLES USED IN DIRECT CARBON CONVERSION FUEL CELLS

(75) Inventors: John F. Cooper, Oakland, CA (US); Nerine Cherepy, Oakland, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 800 days.

(21) Appl. No.: 10/845,939

(22) Filed: May 13, 2004

(65) Prior Publication Data

US 2004/0229109 A1 Nov. 18, 2004

Related U.S. Application Data

(60) Provisional application No. 60/471,499, filed on May 15, 2003.

(51) Int. Cl.
 *H01M 8/14* (2006.01)

(52) U.S. Cl. .......................... 429/46; 429/44

(58) Field of Classification Search ................ None
See application file for complete search history.

(56) References Cited

U.S. PATENT DOCUMENTS

| | | | |
|---|---|---|---|
| 4,115,632 A | 9/1978 | Kinoshita et al. | |
| 6,103,393 A | 8/2000 | Kodas et al. | |
| 6,200,697 B1 | 3/2001 | Pesavento | |
| 6,318,649 B1 | 11/2001 | Mazurkiewicz | |
| 6,887,286 B1 * | 5/2005 | Taki et al. | 48/197 R |
| 2002/0106549 A1 * | 8/2002 | Cooper et al. | 429/40 |
| 2003/0017380 A1 * | 1/2003 | Cooper et al. | 429/46 |

* cited by examiner

*Primary Examiner*—John S Maples
(74) *Attorney, Agent, or Firm*—Eddie E. Scott; John H. Lee

(57) ABSTRACT

A system for preparing particulate carbon fuel and using the particulate carbon fuel in a fuel cell. Carbon particles are finely divided. The finely dividing carbon particles are introduced into the fuel cell. A gas containing oxygen is introduced into the fuel cell. The finely divided carbon particles are exposed to carbonate salts, or to molten NaOH or KOH or LiOH or mixtures of NaOH or KOH or LiOH, or to mixed hydroxides, or to alkali and alkaline earth nitrates.

10 Claims, 5 Drawing Sheets

CARBON FUEL PARTICLES USED IN DIRECT CARBON CONVERSION FUEL CELLS

CROSS-REFERENCE TO RELATED APPLICATIONS

This application claims the benefit of U.S. Provisional Patent Application No. 60/471,499 filed May 15, 2003 and titled "Method for Preparation of Carbon Fuel Particles for Use in Direct Carbon Conversion Fuel Cells." U.S. Provisional Patent Application No. 60/471,499 filed May 15, 2003 and titled "Method for Preparation of Carbon Fuel Particles for Use in Direct Carbon Conversion Fuel Cells" is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to direct carbon conversion and more particularly to carbon fuel particles used in direct carbon conversion.

2. State of Technology

U.S. patent application Ser. No. 2003/0017380 by John F. Cooper et al for a tilted fuel cell apparatus published Jan. 23, 2003 provides the following state of technology information, "High temperature, molten carbonate electrolyte, fuel cells have been shown to be an efficient method of producing energy particularly when the fuel source is hydrogen gas. Carbon as a fuel source in electrochemical cells has been explored." With the use of carbon instead of hydrogen, the efficiency of the fuel cell increases dramatically, as a result of 100% theoretical efficiency and the possibility of full utilization of the fuel in a single pass through the cell.

U.S. patent application Ser. No. 2002/0106549 by John F. Cooper et al for a fuel cell apparatus and method thereof published Aug. 8, 2002 provides the following state of technology information, "High temperature, molten electrolyte, electrochemical cells have been shown to be an efficient method of producing energy particularly when the fuel source is hydrogen gas. Carbon as a fuel source in electrochemical cells has been explored." This patent application teaches the use of carbon particles wetted with molten salts consisting of mixed alkali and/or alkaline earth carbonates. Very high efficiencies were obtained when the carbon particles were produced by the pyrolysis of hydrocarbons in such a manner as to produce disordered or "turbostratic" materials, having a basis graphitic structure but with small dimensions of the domains of microcrystallinity and with increased average spacing between the graphene planes.

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a system for preparing particulate carbon fuel and using the particulate carbon fuel in a fuel cell. Carbon particles are finely divided. The finely dividing carbon particles are introduced into the fuel cell. A gas containing oxygen is introduced into the fuel cell. The finely divided carbon particles are exposed to carbonate salts, or to molten NaOH or KOH or LiOH or mixtures of NaOH or KOH or LiOH, or to mixed hydroxides, or to alkali and alkaline earth nitrates. One embodiment of the present invention provides an apparatus that utilizes carbon particles fuel in a fuel cell comprising a fuel cell structure, structure that allows finely divided carbon particles to be introduced into the fuel cell structure, structure that allows a gas containing oxygen to be introduced into the fuel cell structure, and structure that allows the finely divided carbon particles to be exposed to carbonate salts, or to molten NaOH or KOH or LiOH or mixtures of NaOH or KOH or LiOH, or to mixed hydroxides, or to oxidants such as atmospheric oxygen or alkali and alkaline earth nitrates.

The system has uses in efficient electric power generation and in broad mobile, transportable and stationary applications. The system also has uses in electric power generation at high efficiencies from coal, petroleum derived fuels, petroleum coke, and natural gas. The system can help to conserve precious fossil resources by allowing more power to be harnessed from the same amount of fuel, can help improve the environment by substantially decreasing the amount of pollutants and carbon dioxide emitted into the atmosphere per kilowatt-hour of electrical energy that is generated, and can help decrease emissions of carbon dioxide, which are largely responsible for global warming.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
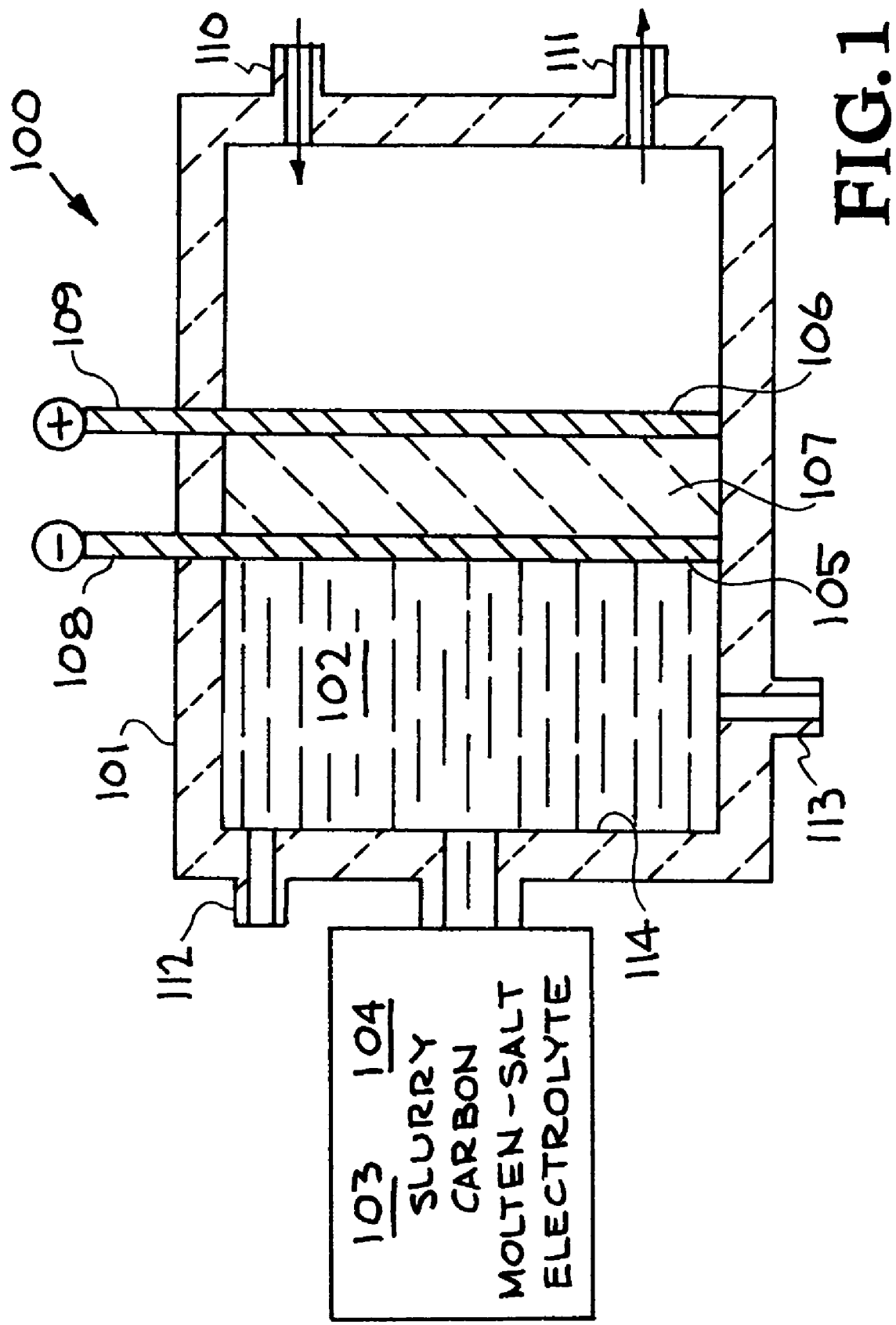
FIG. 1 shows one embodiment of a carbon air fuel cell constructed in accordance with the present invention.

Referring now to the drawings, to the following detailed description, and to incorporated materials, detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

Referring now to FIG. 1, an embodiment of a fuel cell system constructed in accordance with the present invention is illustrated. The system is designated generally by the reference numeral 100. The system 100 provides a direct carbon conversion fuel cell that generates electric power from the electrochemical reaction of carbon and atmospheric oxygen.

Direct carbon conversion fuel cells a method of producing electricity in a fuel cell having an anode and a cathode current collector, an anode fuel consisting of particulates of carbon wetted or contacted with molten salt (mixtures of alkali or alkaline earth carbonates at temperatures above their melting point), and a means of flowing air adjacent to the cathode current collector, this collector being a high surface are porous metal structure made of, for example, sintered nickel particles coated with lithium-doped nickel oxide; silver, copper, gold or other metal providing for the electrochemical reduction of atmospheric oxygen.

The particulate carbon fuels introduced into the fuel cell must become wetted with the molten salt. For some carbon fuels (such as raw coal, petroleum coke, and coked or devolatilized coal), the surfaces are covered with chemical functional groups such as carboxylates, esters, quinoidal, or hydroxyl groups. These groups are readily ionized by amodic oxidation in the presence of molten salts. In the ionized state, they are chemically compatible with the molten salt and are therefore readily wetted by the salt upon contact between the particles and the molten salt resident in the fuel cell.

Other particulate carbon fuels include very pure carbons such as, for example, (1) very pure carbons produced by pyrolysis of hydrocarbons (such as, for example, low-sulfur fuel oil, methane, ethane, propane and higher straight or branched alkanes); (2) acetylene black; (3) furnace blacks and carbon blacks; (4) the thermal decomposition products of any saturated hydrocarbon alkane, alkene or alkyne; and (5) carbon aerogels made by thermal decomposition of the base-catalyzed condensation products of resorcinol with formaldehyde. The surfaces of these very pure materials may tend to be free of ionizable functional groups. Therefore wetting will not readily occur upon contact between the carbon and the molten carbonate salt.

The system 100 provides a method for preparing a particulate carbon fuel for the fuel cell and a method of introducing the particulate carbon fuel into the fuel cell in a manner allowing a rapid startup of the electrochemical reaction that produces electric power. The system 100 is useful in preparing particulates of very pure carbon, such as previously described.

A process, called direct carbon conversion, has been convincingly demonstrated. U.S. patent applications No. 2002/0106549 published Aug. 8, 2002 and No. 2003/0017380 published Jan. 23, 2003 by John F. Cooper et al show high temperature, molten electrolyte electrochemical cells for directly converting a carbon fuel to electrical energy. The disclosures of U.S. patent applications Nos. 2002/0106549 and 2003/0017380 are incorporated herein by this reference.

With the system 100, it is possible to introduce into the fuel cell particulates of highly reactive fuels that are made of substantially pure carbon, and allow these particles to rapidly become wetted and begin the electrochemical reaction that produces electric power.

The system 100 enables use of large quantities of carbon blacks produced industrially to be used directly in carbon conversion fuel cells, without laborious and energy intensive mixing of carbon and carbonate.

The system 100 comprises a fuel cell housing 101 containing an anode 105 and a cathode 106. A paste, slurry or wetted aggregation 102 is introduced into the fuel cell housing 101. The paste, slurry, or wetted aggregation of carbon particles 102 comprises carbon particles 104 immersed in a molten-salt electrolyte 103 and contained within the anode chamber part of the cell 114.

The carbon 104 is in the form of finely divided particles, typical size 100-1000 micrometers, having a reactive nanostructure called "turbostratic." The carbon particles are immersed in a molten-salt electrolyte 103 consisting of a mixture of molten alkali carbonates $(Li,K,Na)_2CO_3$ to form a paste, slurry or wetted aggregation of particles.

The slurry 102 is introduced into the fuel cell housing 101. The molten salt electrolyte 103 provides a continuous electrolyte of carbon particles 104 between the porous nickel plate anode current collector 105 and a porous nickel plate cathode 106. An inert ceramic separator 107 (e.g., woven fabrics or felts comprised of alumina or zirconia fibers) saturated with the molten salt may be located between anode 105 and cathode 106. The anode current collector 105 and the cathode 106 produce an electrical potential between the anode lead 108 and the cathode lead 109, from which electrical current may be drawn by closing the circuit through a load (not shown). The fuel cell also provides ports for introduction of air plus carbon dioxide 110 and exhaust of air and unreacted carbon dioxide 111. The fuel cell also provides at least one port for exhaust of carbon dioxide reaction product, 112, from the anode chamber; and for the draining of excess molten carbonate from the anode chamber (or introducing additional molten carbonate into the system), designated by 113.

The fuel cell system 100 reactions are as follows:

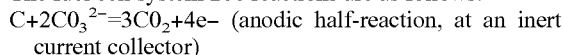

$C + 2CO_3^{2-} = 3CO_2 + 4e-$ (anodic half-reaction, at an inert current collector)

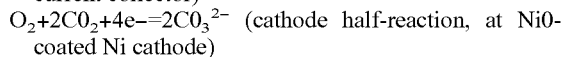

$O_2 + 2CO_2 + 4e- = 2CO_3^{2-}$ (cathode half-reaction, at NiO-coated Ni cathode)

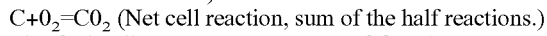

$C + O_2 = CO_2$ (Net cell reaction, sum of the half reactions.)

The fuel cell 100 uses aggregates of fine (10- to 1,000-micrometer-diameter) carbon particles 104 distributed in, for example, a mixture of molten lithium, sodium, or potassium carbonate at a temperature of 650 to 850° C. The overall cell reaction is carbon and oxygen (from ambient air) forming carbon dioxide and electricity. The reaction yields 80 percent of the carbon-oxygen combustion energy as electricity—approximately 7.2 kWh/kg-carbon. It provides typically up to 2 kilowatt of power per square meter of cell surface area—a rate sufficiently high for practical applications. Yet no direct combustion of the carbon takes place. Electrochemical losses within the cell also evolve nearly 20% of the combustion energy as waste heat.

The fuel cell 100 is refueled by, for example, entrainment of the fine carbon particles 104 into the cell housing 101 in a gas such as carbon dioxide or nitrogen in such a manner that the carbon particles 104 are immediately wetted by the molten salt upon contact with the ambient molten salt within the anode chamber, and thus wetted, remain in electrical contact with the melt until consumed by anodic oxidation.

The system 100 has uses in efficient electric power generation and in broad mobile, transportable and stationary applications. The system 100 also has uses in electric power generation at high efficiencies from coal, petroleum derived fuels, petroleum coke, and natural gas. The system 100 can help to conserve precious fossil resources by allowing more power to be harnessed from the same amount of fuel, can help improve the environment by substantially decreasing the amount of pollutants emitted into the atmosphere per kilowatt-hour of electrical energy that is generated, and can help decrease emissions of carbon dioxide, which are largely responsible for global warming.

The carbon-air fuel cell gives off a pure stream of carbon dioxide through port 112 that can be captured without incurring additional costs of collection and separation, as required from the exhausts of smoke stacks. The stream of carbon dioxide, already only a fraction of current processes, can be sequestered or used for enhanced oil and gas recovery through existing pipelines. Pyrolysis—the thermal decomposition method used to turn hydrocarbons into hydrogen and tiny pure carbon particles used in direct carbon conversion—consumes less energy and requires less capital than the electrolysis or steam-reforming processes required to produce hydrogen-rich fuels. Pyrolysis produces millions of tones of carbon blacks annually in the U.S. Carbon black is a disordered form of carbon produced by thermal or oxidative decomposition of hydrocarbons and is used to manufacture many different products, including tires, inks, and plastic fillers. A large fraction of the annual production is "off spec"—meaning unsuitable for applications requiring specific size, color, functional groups, conductivity, etc., and is available as a low cost fuel.

Figure 2:
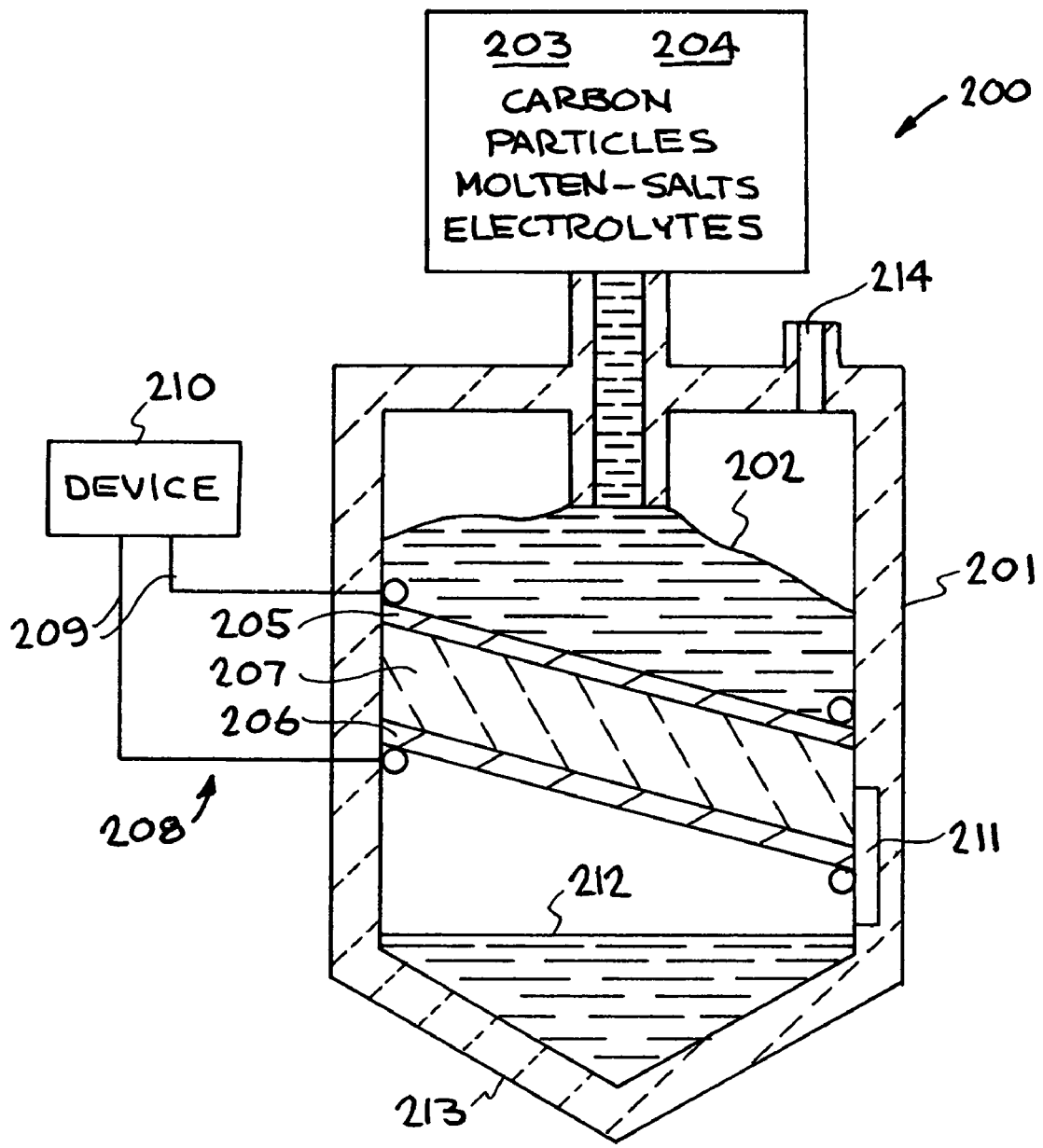
FIG. 2 shows a tilted electrochemical cell to promote rapid draining of excess electrolyte constructed in accordance with the present invention.

Referring now to FIG. 2, another embodiment of a fuel cell system constructed in accordance with the present invention is illustrated. The system is designated generally by the reference numeral 200. The fuel cell system comprises a fuel cell body 201, an anode 205 in the fuel cell body 201, a cathode 206 in the fuel cell body 201, a molten mixture of alkali- or alkaline earth metal carbonates electrolyte 202 in the fuel cell body 201, and a carbonaceous fuel 204 in the fuel cell body 201. The fuel cell system 200 produces electricity with a molten mixture of alkali metal or alkaline earth metal carbonates and finely divided carbon particles. The particulate carbonaceous fuel is introduced into the fuel cell and produces the direct electrochemical conversion of carbon into electricity. A particulate carbonaceous fuel is prepared by finely dividing carbon particles and mixing the carbon particles with an electrolyte comprising a molten mixture of alkali metal or alkaline earth metal carbonates.

The system 200 provides a direct carbon conversion fuel cell that generates electric power from the electrochemical reaction of carbon and atmospheric oxygen. A slurry or wetted aggregation 202 is introduced into the fuel cell housing 201. The slurry 202 comprises carbon particles 204 immersed in a molten-salt electrolyte 203.

The carbon 204 is in the form of finely divided particles, size 10-1000 micrometers, having a reactive nano-structure called "turbostratic." The carbon particles are wetted by a molten-salt electrolyte 203 consisting of a mixture of molten alkali carbonates $(Li,K,Na)^2CO^3$ to form a slurry, dense paste or wetted aggregation of particles.

The molten salt electrolyte 203 provides a continuous electrolyte of carbon particles 204 between the porous nickel plate anode current collector 205 and a porous nickel plate cathode 206. An inert ceramic separator 207 (e.g., woven alumina or zirconia fibers) saturated with the molten salt is located between anode 205 and cathode 206. The anode current collector 205 and the cathode 206 produce an electrical current 208 in a circuit 209 that extends between anode 205 and cathode 206. The electrical current 208 is used to power a device 210 within the circuit 209.

The carbon particles 204 can be distributed pneumatically to individual cells, such as cell housing 201, by a small amount of carbon dioxide fed back to the cell from the continuously produced carbon dioxide stream. The pneumatic transport of carbon particles through complex equipment is a widespread industrial practice. The carbon particles 204 and oxygen (ambient air) are introduced as fuel and oxidizer, respectively. The slurry 202 formed by mixing the carbon particles 204 with molten carbonate 203 constitutes the anode 206. The anode reaction is carbon and carbonate ions forming carbon dioxide and electrons. At the cathode 205, which is similar to that used in other high-temperature fuel cells, oxygen, carbon dioxide, and electrons from the anode form carbonate ions. The porous ceramic separator 207 holds the melt in place and allows the carbonate ions to migrate between the two compartments.

Excess electrolyte may drain and flow through port 211 where it is stored as a liquid 212 in a sump 213. By capillary forces, the liquid in then sump may exchange with that in the slurry and flow backwards through port 211. The system 200 provides a tilted electrochemical cell to promote rapid draining of excess electrolyte, as required to form and maintain a catalytic surface on the nickel cathode.

The driving force for energy production, called electromotive force, does not degrade as the carbon 204 is progressively consumed to make power and carbon dioxide, so the voltage remains constant. That means that in making a single pass through the cell, all the carbon is consumed at a maximum yet constant voltage.

The fuel cell system 200 reactions are as follows:

$C + 2CO^3{}_2{}^- = 3CO^2 + 4e-$ anodic half-reaction, at an inert (e.g., Ni) current collector $O_2 + 2CO_2 + 4e- = 2CO_3{}^{2-}$ cathode half-reaction, at a NiO-coated Ni cathode $C + O_2 = CO_2$ Net cell reaction, sum of the half reactions The fuel cell 200 uses aggregates of fine (10- to 1,000-micrometer-diameter) carbon particles 204 distributed in a mixture of molten lithium, sodium, or potassium carbonate at a temperature of 650 to 850° C. The overall cell reaction is carbon and oxygen (from ambient air) forming carbon dioxide and electricity. The reaction yields 80 percent of the carbon-oxygen combustion energy as electricity. It provides up to 2 kilowatt of power per square meter of cell surface area—a rate sufficiently high for practical applications. Yet no burning of the carbon takes place.

The fuel cell 200 is refueled by, for example, entrainment of the fine carbon particles 204 into the cell housing 201 in a gas such as carbon dioxide or nitrogen in such a manner that the carbon particles 204 are immediately wetted by the molten salt upon contact and thus wetted, remain in electrical contact with the melt until consumed by anodic oxidation. The system 200 provides a fuel cell configuration into which carbon prepared by the methods of this invention may be introduced into the fuel cell an instantly wetted with ambient molten salt (or molten salt introduced concurrently) to allow the reaction generating electric power to take place.

Pretreatment of Carbon Particulates to Enable Contact Wetting—The present invention provides methods of pretreatment of carbon with hydroxide or carbonate materials in the presence of oxygen to render the surface of such particles chemically altered in a manner that promotes rapid wetting by molten carbonate upon contact between the particles and the molten carbonate. Such treatment allows the carbon particles to be introduced into the fuel cell structure of FIG. 1 or FIG. 2 or other molten-carbonate based fuel cells and batteries and to be wetted upon contact with resident molten salt or upon contact with molten salt introduced into the cells concurrently.

The present invention provides a number of methods of producing electricity in a fuel cell. The methods make it possible to introduce particulates of highly reactive fuels that are made of substantially pure carbon into a fuel cell and allow these particles to rapidly become wetted and begin the electrochemical reaction that produces electric power.

Figure 3:
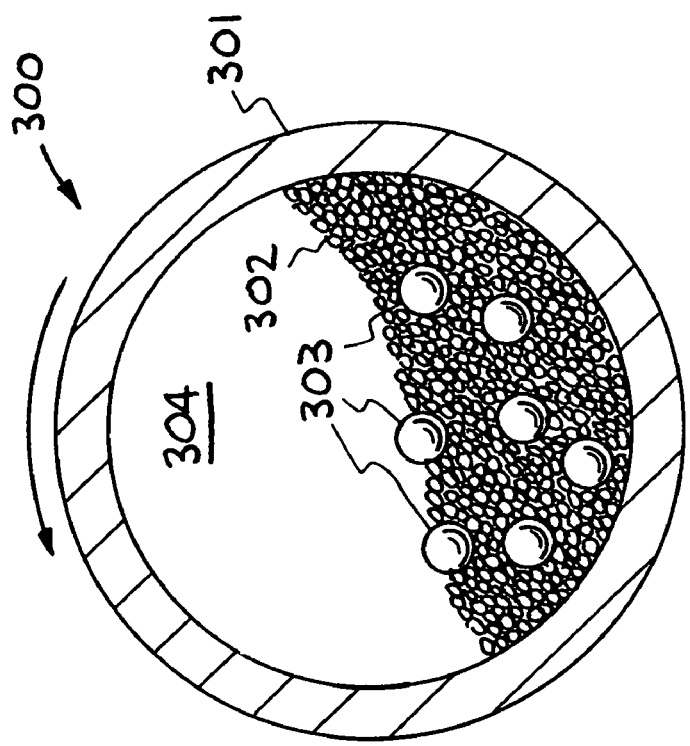
FIG. 3 illustrates a method of using a ball mill to contact carbon, salt and atmospheric oxygen in a rotating drum.

Method 1—Cold Milling of Carbon Particles and Carbonate Salts. Carbon particles of size range from 0.1 micrometer to 1 centimeter are mixed with alkali or alkaline earth carbonate salts at ambient temperatures (or at elevated temperatures below the melting point of the salt mixtures) and ground or milled together in the presence of oxygen (e.g., from air), using any of the conventional milling techniques. Such techniques include but are not limited to ball milling using steel or ceramic balls in a rotating drum; high velocity impellers; planetary wheel, ball or roller mills; or hammer mills. The contacting process is shown schematically in FIG. 3. In this configuration 300, a mixture of carbon particles and dry salt 302 are introduced into a rotating drum 301 together with hard metal or ceramic balls 303, in the presence of air 304. The action of such milling causes the salt to fuse on the surface of the carbon particles over microscopic dimensions and flow into surface defects such as cracks, open pores, or grain boundaries. The precise method used to effect this contacting is of secondary importance. The presence of oxygen (as in air) allows some degree of oxidation at the points of contact between salt and carbon which may have short-lived high temperatures allowing partial oxidation of the surface. The net effect of this milling is to promote the formation of functional groups such as carboxylate or ester groups on the surface of the carbon particle which, when contacting molten salt, are ionized. The ionized surface then allows wetting with the ionized melt because of similar electronic structure.

Method 2—Contacting of Carbon Particles with Molten Alkali Hydroxides in Presence of Oxgyen. Molten alkali hydroxides (LiOH, NaOH, KOH, CsOH) are highly aggressive agents that, in the presence of atmospheric oxygen, promote the limited oxidation of the carbon surface. Introduction of particulate carbon (size range 0.1 micrometer to 1 mm) into molten salt mixtures of one or more of these components promotes the oxidation of the carbon surface at a relatively low temperature (<400 C.) in the presence of air.

Figure 4:
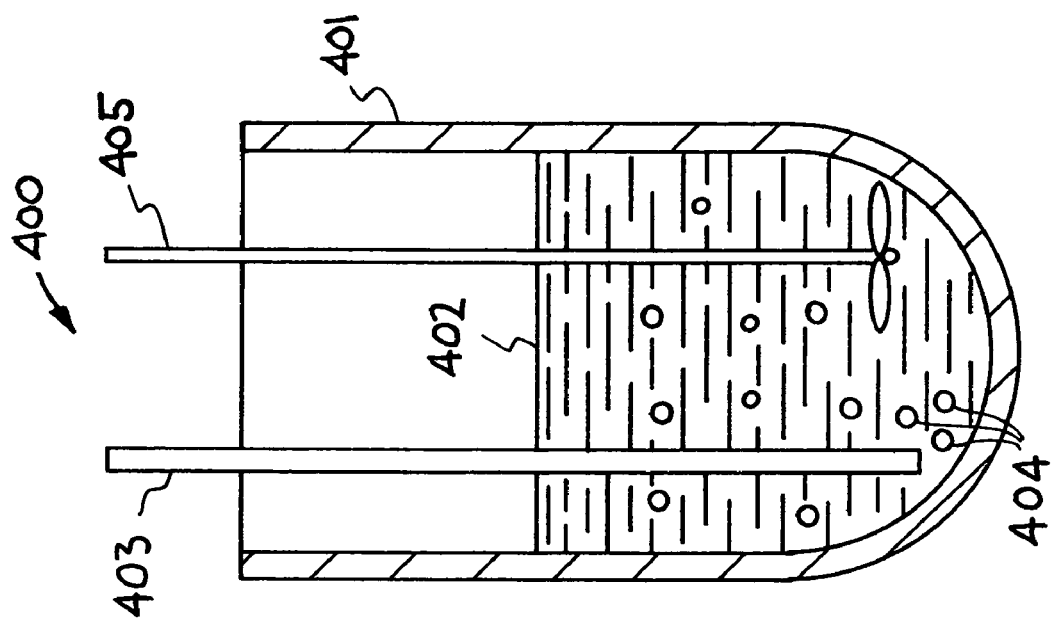
FIG. 4 illustrates a method of treating particulate carbon, in slurry of molten alkali or alkaline earth hydroxides, with oxidation by sparged air.

FIG. 4 illustrates a method of contacting particles of carbon with the molten alkali hydroxides with concurrent sparging of oxygen (air) through the melt. The method 400 uses a containment vessel of suitable material resistant to molten hydroxides. The mixture is stirred with an impellor to promote mixing and contacting with oxygen.

The method 400, as shown in FIG. 4, provides contacting particles of carbon with the molten alkali hydroxides with concurrent sparging of oxygen (air) through the melt 400 using a containment vessel of suitable material resistant to molten hydroxides, the carbon and alkali hydroxide mixture 402 is introduced into vessel 401 and sparged with oxygen 404 from an immersed tube or conduit 403. The mixture is stirred with an impellor 405 to promote mixing and contacting with oxygen.

Method 3—Exposure of Carbon Particles to Alkali Carbonate Vapors at Elevated Temperatures. At the operating temperatures of the fuel cells depicted in FIG. 1 and FIG. 2 and of other configurations of a direct carbon conversion fuel cell, the molten carbonate salt will tend to dissociate to form metal oxide vapors and carbon dioxide. For example, sodium carbonate will dissociate according to:

$Na_2CO_3 = Na_2O + CO_2$

If the feed line of carbon particles to the cell is arranged such that vapors from the molten salt are allowed to flow through the feed line counter current to the movement of the carbon particles, then the alkali oxides will deposit onto the surface of the carbon particles. FIG. 4 illustrates such an arrangement. Such deposition under slightly oxidizing conditions will promote the formation of surface functional groups such as carboxylates, esters, hydroxyl, or quinoidal groups that, upon contact with molten salts, will tend to ionize. This method does not require anything other than arrangement of the carbon feed to allow contacting of the feed particles with the exiting gas from the fuel cell. The amount of exiting gas allowed to contact must be controlled to prevent excess losses by Boudouard corrosion reaction, $C + CO_2 = 2CO$, and consequent loss of energy by consumption of the carbon. This may be done by dividing the exit gas flow (predominately $CO_2$ with trace alkali oxides) between feed and exhaust pipe, to limit the amount of CO2/oxide vapor that is allowed to contact the incoming carbon particles.

Referring again to FIG. 2, part of the exhaust carbon dioxide form the cell exits the cell through channel 203 and contacts the incoming stream of carbon 204 (un mixed with salt) to provide the desired changes to functional groups and wetability. The balance of the exhaust carbon dioxide exits through the vent, 214. The relative amounts of carbon dioxide exiting through 214 and 203 need to be controlled so that excessive amounts of carbon dioxide are not allowed to contact the carbon; this would promote fuel loss through the Boudouard reaction, described above. The oxygen adsorbed on the carbon (being exposed at some time to air) is sufficient to provide the necessary oxidation to promote the formation of ionized functional groups.

Figure 5:
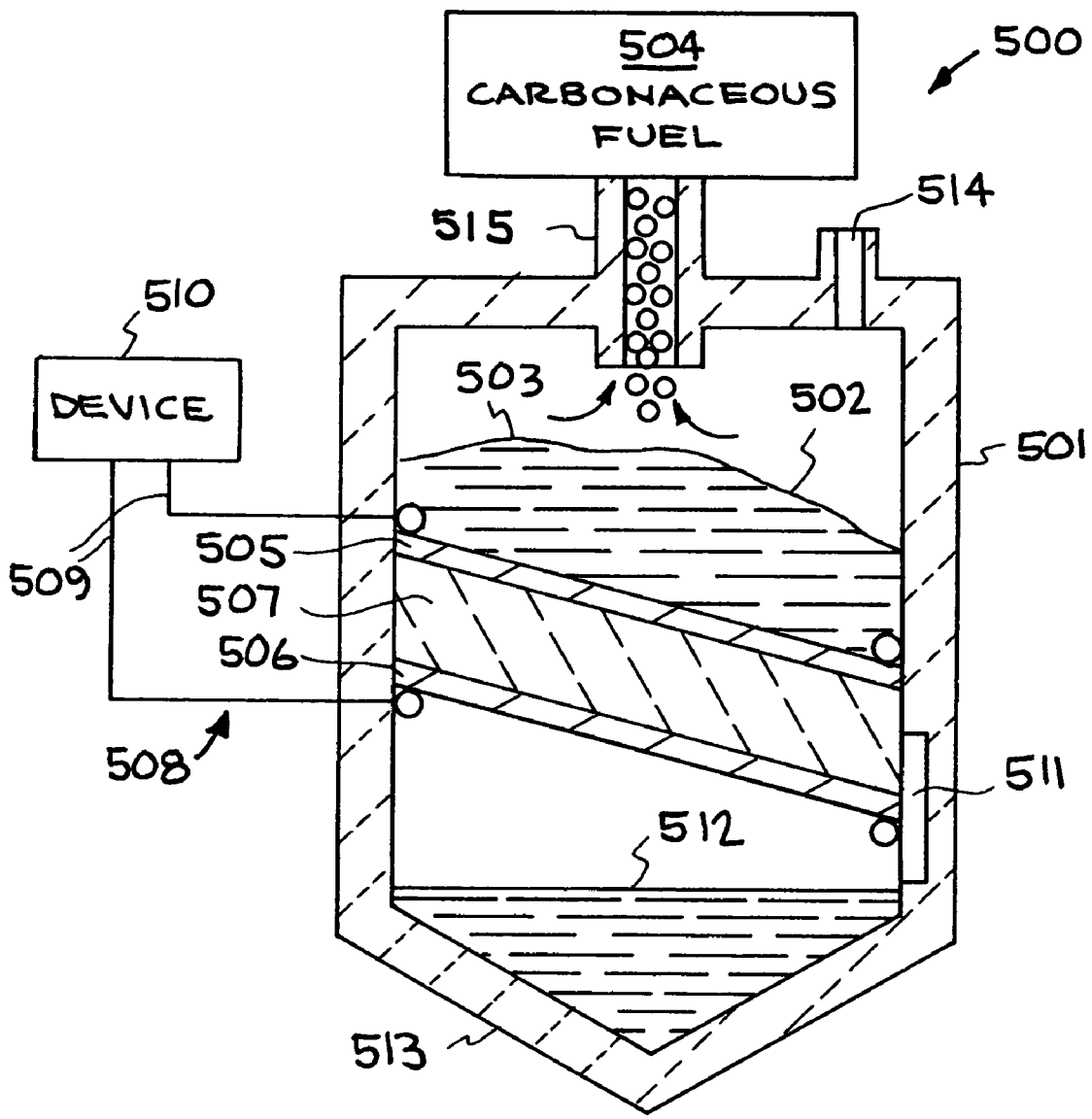
FIG. 5 shows an arrangement of fuel cell and exiting vapors from the molten salt in the fuel cell to allow contacting between the salt vapors and the incoming carbon particles.

Referring to FIG. 5, an arrangement of fuel cell and exiting vapors from the molten salt in the fuel cell to allow contacting between the salt vapors and the incoming carbon particles is shown.

It is clear that the same pretreatment of the carbon particles may be achieved by passing an inert gas over molten carbonate at 700-850 C, and thence through the particle bed comprised of carbon particles. This technique is an obvious extension of that described in FIG. 5, and forgoes the use of the latent heat of the fuel cell to promote the dissociation of the carbonate and the formation of a gas phase containing oxide species.

The system is designated generally by the reference numeral 500. The fuel cell system comprises a fuel cell body 501, an anode 505 in the fuel cell body 501, a cathode 506 in the fuel cell body 501, a molten mixture of alkali metal or alkaline earth metal carbonates electrolyte 502 in the fuel cell body 501, and a carbonaceous fuel 504 in the fuel cell body 501. The fuel cell system 500 produces electricity with a molten mixture of alkali metal or alkaline earth metal carbonates and finely divided carbon particles. The particulate carbonaceous fuel is introduced into the fuel cell and produces the direct electrochemical conversion of carbon into electricity. A particulate carbonaceous fuel is prepared by finely dividing carbon particles and mixing the carbon particles with an electrolyte comprising a molten mixture of alkali metal or alkaline earth metal carbonates.

The system 500 provides a direct carbon conversion fuel cell that generates electric power from the electrochemical reaction of carbon and atmospheric oxygen. A slurry or wetted aggregation 502 is introduced into the fuel cell housing 501 through port 515. The slurry 502 comprises carbon particles 504 immersed in a molten-salt electrolyte 503.

The carbon 504 is in the form of finely divided particles, size 10-1000 micrometers, having a reactive nano-structure called "turbostratic." The carbon particles are wetted by a molten-salt electrolyte 503 consisting of a mixture of molten alkali carbonates (LiK,Na)2C03 to form a slurry, dense paste or wetted aggregation of particles.

The molten salt electrolyte 503 provides a continuous electrolyte of carbon particles 504 between the porous nickel plate anode current collector 505 and a porous nickel plate cathode 506. An inert ceramic separator 507 (e.g., woven or felted alumina or zirconia fibers) saturated with the molten salt is located between anode 505 and cathode 506. The anode current collector 505 and the cathode 506 produce an electrical current 508 in a circuit 509 that extends between anode 505 and cathode 506. The electrical current 508 is used to power a device 510 within the circuit 509.

The carbon particles 504 can be distributed pneumatically to individual cells, such as cell housing 501, by a small amount of carbon dioxide fed back to the cell from the continuously produced carbon dioxide stream. The pneumatic transport of carbon particles through complex equipment is a widespread industrial practice. The carbon particles 504 and oxygen (ambient air) are introduced as fuel and oxidizer, respectively. The slurry 502 formed by mixing the carbon particles 504 with molten carbonate 503 constitutes the anode. The anode reaction is carbon and carbonate ions forming carbon dioxide and electrons. At the cathode 506, which is similar to that used in other high-temperature fuel cells, oxygen, carbon dioxide, and electrons from the anode form carbonate ions. The porous ceramic separator 507 holds the melt in place and allows the carbonate ions to migrate between the two compartments.

Excess electrolyte may drain and flow through port 511 where it is stored as a liquid 512 in a sump 513. By capillary forces, the liquid in then sump may exchange with that in the slurry by flow backwards through port 511. The system 500 provides a tilted electrochemical cell to promote rapid draining of excess electrolyte.

The fuel cell system 500 reactions are as follows:
 a. $C+2CO_3^{2-}=3CO_2+4e-$ anodic half-reaction, at an inert (e.g., Ni) current collector
 b. $O_2+2CO_2+4e-=2CO_3^{2-}$ cathode half-reaction, at a NiO-coated Ni cathode
 c. $C+O_2=CO_2$ Net cell reaction, sum of the half reactions The fuel cell 500 uses aggregates of extremely fine (10- to 1,000-micrometer-sized) carbon particles 504 distributed in a mixture of molten lithium, sodium, or potassium carbonate at a temperature of 650 to 850° C. The overall cell reaction is carbon and oxygen (from ambient air) forming carbon dioxide and electricity. The reaction yields 80 percent of the carbon-oxygen combustion energy as electricity. It provides up to 1 kilowatt of power per square meter of cell surface area—a rate sufficiently high for practical applications. Yet no burning of the carbon takes place.

Method 4—Use of Chemical Oxidants in the Pretreatment of Carbon Fuels. As described earlier, method 2 provides the activation of carbon particles by exposure to molten alkali or alkaline earth hydroxides with sufficient oxygen to promote oxidation of the carbon surface and formation of ionizable functional groups. The same oxidation may occur with the use of other oxidizing agents such as, for example, nitrates. If a small quantity of nitrate is mixed with hydroxide, the resultant mixture will tend to oxidize the surface of the carbon. Pure molten nitrate should not be mixed with particulate carbon, as an explosive mixture will result. If the concentration of sodium nitrate in sodium hydroxide is maintained below 10%, the molten salt will support oxidation but not rapid combustion or explosion.

The present invention is useful for carbon fuels comprised of essentially pure carbon, that has not previously been subjected to oxidation. Such carbon materials include: acetlyene black, various carbon blacks and furnace blacks, and the carbons formed by decomposition of hydrocarbon gasses and oils. The techniques described above are also useful in the pretreatment of aerogels and xerogels derived from thermal decomposition of the green aerogels made by base catalyzed condensation of formaldehyde and recorcinol, etc.

Figure 6:
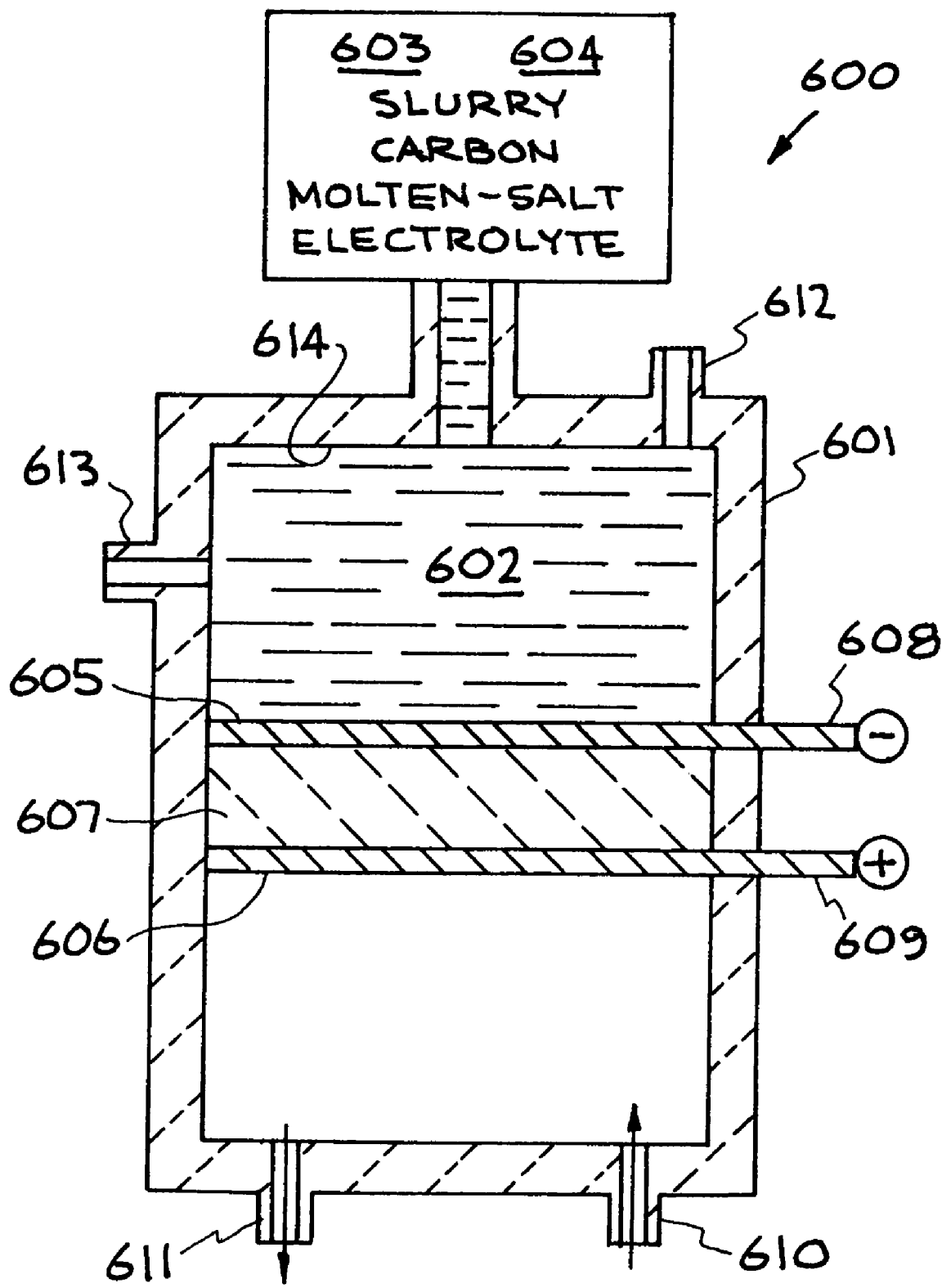
FIG. 6 illustrates another embodiment of a carbon air fuel cell constructed in accordance with the present invention.

Referring now to FIG. 6, another embodiment of a fuel cell system constructed in accordance with the present invention is illustrated. The system is designated generally by the reference numeral 600. The system 600 comprises a fuel cell housing 601 containing an anode 605 and a cathode 606. Carbon particles 604 are introduced into the top of the fuel cell fuel cell housing 601. The carbon particles 604 are in the form of finely divided particles, typical size 10-1000 micrometers, having a reactive nano-structure called "turbostratic." The carbon particles are immersed in a molten-salt electrolyte 603 consisting of a mixture of molten alkali carbonates $(Li,K,Na)_2CO_3$ to form a paste, slurry or wetted aggregation of particles, 602.

The paste, slurry, or wetted aggregation of carbon particles 602 is introduced into the top of the fuel cell fuel cell housing 601. The paste, slurry, or wetted aggregation of carbon particles 602 comprises the carbon particles 604 immersed in the molten-salt electrolyte 603 which are introduced into the anode chamber 614 part of the cell. An inert ceramic separator 607 (e.g., woven alumina or zirconia fibers) saturated with the molten salt is located at the bottom of the anode chamber 614 and separates anode 605 from cathode 606. The inert ceramic separator 607 saturated with the molten salt is located below anode current collector 605. Gravity helps the flow of the paste, slurry, or wetted aggregation of carbon particles 602. The molten salt electrolyte 603 provides a continuous electrolyte between the porous nickel plate anode current collector 605 and a porous nickel plate cathode 606. The system 600 provides a direct carbon conversion fuel cell that generates electric power from the electrochemical reaction of carbon and atmospheric oxygen.

The anode current collector 605 and the cathode 606 produce an electrical potential between the anode lead 608 and the cathode lead 609, from which electrical current may be drawn by closing the circuit through a load (not shown). The fuel cell also provides ports for introduction of air plus carbon dioxide 610 and exhaust of air and unreacted carbon dioxide 611. The fuel cell also provides at least one port for exhaust of carbon dioxide reaction product, 612, from the anode chamber; and for the draining of excess molten carbonate from the anode chamber (or introducing additional molten carbonate into the system), designated by 613.

The fuel cell system 600 reactions are as follows:
 $C+2CO_3^{2-}=3CO_2+4e-$ (anodic half-reaction, at an inert current collector)
 $O_2+2CO_2+4e-=2CO_3^{2-}$ (cathode half-reaction, at NiO-coated Ni cathode)
 $C+O_2=CO_2$ (Net cell reaction, sum of the half reactions.)

The fuel cell 600 uses aggregates of fine (10- to 1,000-micrometer-diameter) carbon particles 604 distributed in, for example, a mixture of molten lithium, sodium, or potassium carbonate at a temperature of 650 to 850° C. The overall cell reaction is carbon and oxygen (from ambient air) forming carbon dioxide and electricity. The reaction yields 80 percent of the carbon-oxygen combustion energy as electricity—approximately 7.2 kWh/kg-carbon. It provides typically up to 2 kilowatt of power per square meter of cell surface area—a rate sufficiently high for practical applications. Yet no direct combustion of the carbon takes place. Electrochemical losses within the cell also produce nearly 2 kWh of thermal energy that is evolved as waste heat.

The fuel cell 600 is refueled by, for example, entrainment of the fine carbon particles 604 into the cell housing 601 in a gas such as carbon dioxide or nitrogen in such a manner that the carbon particles 604 are immediately wetted by the molten salt upon contact with the ambient molten salt within the anode chamber, and thus wetted, remain in electrical contact with the melt until consumed by anodic oxidation.

The system 600 has uses in efficient electric power generation and in broad mobile, transportable and stationary applications. The system 600 also has uses in electric power generation at high efficiencies from coal, petroleum derived fuels, petroleum coke, and natural gas. The system 600 can help to conserve precious fossil resources by allowing more power to be harnessed from the same amount of fuel, can help improve the environment by substantially decreasing the amount of pollutants emitted into the atmosphere per kilowatt-hour of electrical energy that is generated, and can help decrease emissions of carbon dioxide, which are largely responsible for global warming.

Direct carbon conversion fuel cells provide a method of producing electricity in a fuel cell having an anode and a cathode current collector, an anode fuel consisting of particulates of carbon wetted or contacted with molten salt (mixtures of alkali or alkaline earth carbonates at temperatures above their melting point), and a means of flowing air adjacent to the cathode current collector, this collector being a high surface are porous metal structure made of, for example, sintered nickel particles coated with lithium-doped nickel oxide; silver, copper, gold or other metal providing for the electrochemical reduction of atmospheric oxygen.

The particulate carbon fuels introduced into the fuel cell must become wetted with the molten salt. For some carbon fuels (such as raw coal, petroleum coke, and coked or devolatilized coal), the surfaces are covered with chemical functional groups such as carboxylates, esters, quinoidal, or hydroxyl groups. These groups are readily ionized in the presence of molten salts. In the ionized state, they are chemically compatible with the molten salt and are therefore readily wetted by the salt upon contact between the particles and the molten salt resident in the fuel cell.

Other particulate carbon fuels include very pure carbons such as, for example, (1) very pure carbons produced by pyrolysis of hydrocarbons (such as, for examples, fuel oil, methane, ethane, propane and higher straight or branched alkanes); (2) acetylene black; (3) furnace blacks and carbon blacks; (4) the thermal decomposition products of any saturated hydrocarbon alkane, alkene or alkyne; and (5) carbon aerogels made by thermal decomposition of the base-catalyzed condensation products of resorcinol with formaldehyde. The surfaces of these very pure materials may tend to be free of ionizable functional groups. Therefore wetting will not readily occur upon contact between the carbon and the molten carbonate salt.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

The invention claimed is:

1. A fuel cell apparatus, comprising:
    a fuel cell body having an upper portion, sides, a bottom portion, and an interior,
    finely divided carbon particles of ten to one thousand micrometer-diameter,
    molten lithium, sodium, or potassium carbonate, wherein said finely divided carbon particles are distributed in said molten lithium, sodium, or potassium carbonate to form an electrolyte,
    an opening structure in said upper portion of said fuel cell body that allows said finely divided carbon particles distributed in said molten lithium, sodium, or potassium carbonate to be introduced into said interior of said fuel cell body,
    a gas containing oxygen,
    an opening structure in said upper portion of said fuel cell body that allows said gas containing oxygen to be introduced into said interior of said fuel cell body,
    a tilted anode structure that extends between said sides of said fuel cell body,
    a tilted cathode structure that extends between said sides of said fuel cell body,
    a tiled inert ceramic separator structure that extends between said sides of said fuel cell body, wherein said tiled inert ceramic separator structure is positioned between said tilted anode structure and said tilted cathode structure, and
    a drain and flow through port structure in one of said sides of said fuel cell body adjacent said tiled inert ceramic separator structure, wherein said drain and flow through port structure allows said finely divided carbon particles distributed in said molten lithium, sodium, or potassium carbonate electrolyte to drain to said bottom portion of said fuel cell body.

2. The apparatus of claim 1 wherein said finely divided carbon particles are derived from carbon fuels.

3. The apparatus of claim 2 wherein said carbon fuels comprise raw coal or petroleum coke or coked coal or devolatilized coal or fuel oil or methane or ethane or propane or alkanes or acetylene black or furnace blacks or carbon blacks or carbon aerogels or mixtures of said raw coal or petroleum coke or coked coal or devolatilized coal or fuel oil or methane or ethane or propane or alkanes or acetylene black or furnace blacks or carbon blacks or carbon aerogels.

4. The apparatus of claim 1 wherein said finely divided carbon particles distributed in said molten lithium, sodium, or potassium carbonate to form an electrolyte comprises a mixture of molten lithium, sodium, or potassium carbonate at a temperature of 650 to 850° C. and said finely divided carbon particles.

5. The apparatus of claim 1 wherein said finely divided carbon particles comprise finely divided carbon particles having a turbostratic nanostructure.

6. The apparatus of claim 1 wherein carbon dioxide is produced in said interior of said fuel cell body and including structure for allowing said carbon dioxide to be removed from said fuel cell body.

7. The apparatus of claim 1 wherein said opening structure in said upper portion of said fuel cell body that allows a gas containing oxygen to be introduced into said interior of said fuel cell structure comprises structure that allows said finely divided particles of carbon to come into contact with said molten lithium, sodium, or potassium carbonate with concurrent sparging of oxygen.

8. The apparatus of claim 1 including an impellor in said interior of said fuel cell body to promote mixing and contacting with said oxygen.

9. An apparatus, comprising:

fuel cell means, said fuel cell means including a fuel cell body having an upper portion, sides, a bottom portion, and an interior, carbon particle means for introducing finely divided carbon particles into said fuel cell means, said carbon particle means comprising finely divided carbon particles of ten to one thousand micrometer-diameter, molten lithium, sodium, or potassium carbonate, wherein said finely divided carbon particles are distributed in said molten lithium, sodium, or potassium carbonate to form an electrolyte, an opening structure in said upper portion of said fuel cell body that allows said finely divided carbon particles distributed in said molten lithium, sodium, or potassium carbonate to be introduced into said interior of said fuel cell body, oxygen means for introducing a gas containing oxygen into said fuel cell means, said oxygen means including a gas containing oxygen and an opening structure in said upper portion of said fuel cell body that allows said gas containing oxygen to be introduced into said interior of said fuel cell body, a tilted anode structure that extends between said sides of said fuel cell body, a tilted cathode structure that extends between said sides of said fuel cell body, a tiled inert ceramic separator structure that extends between said sides of said fuel cell body, wherein said tiled inert ceramic separator structure is positioned between said tilted anode structure and said tilted cathode structure, and a drain and flow through port structure in one of said sides of said fuel cell body adjacent said tiled inert ceramic separator structure, wherein said drain and flow through port structure allows said finely divided carbon particles distributed in said molten lithium, sodium, or potassium carbonate electrolyte to drain to said bottom portion of said fuel cell body.

10. The apparatus of claim 9 wherein said finely divided carbon particles are derived from carbon fuels comprising raw coal or petroleum coke or coked coal or devolatilized coal or fuel oil or methane or ethane or propane or alkanes or acetylene black or furnace blacks or carbon blacks or carbon aerogels or mixtures of said raw coal or petroleum coke or coked coal or devolatilized coal or fuel oil or methane or ethane or propane or alkanes or acetylene black or furnace blacks or carbon blacks or carbon aerogels.

* * * * *